No. 837,739. PATENTED DEC. 4, 1906.
W. SCHULTZ.
MOWER.
APPLICATION FILED SEPT. 12, 1905.
2 SHEETS—SHEET 1.
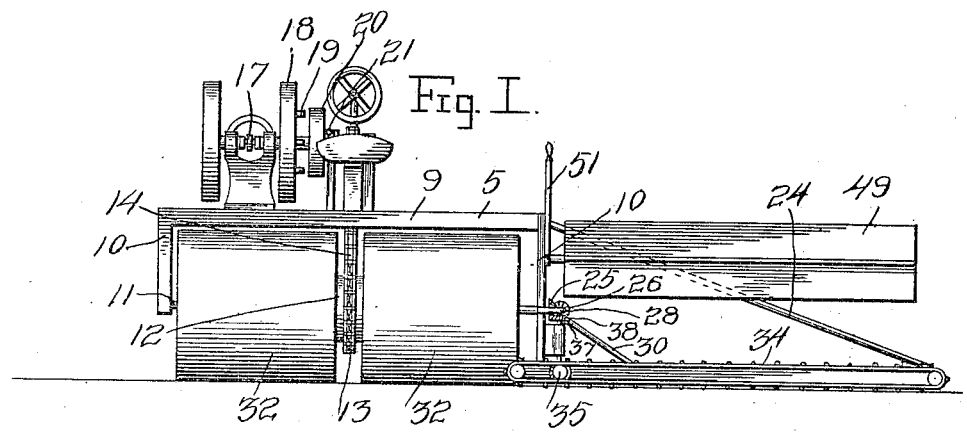
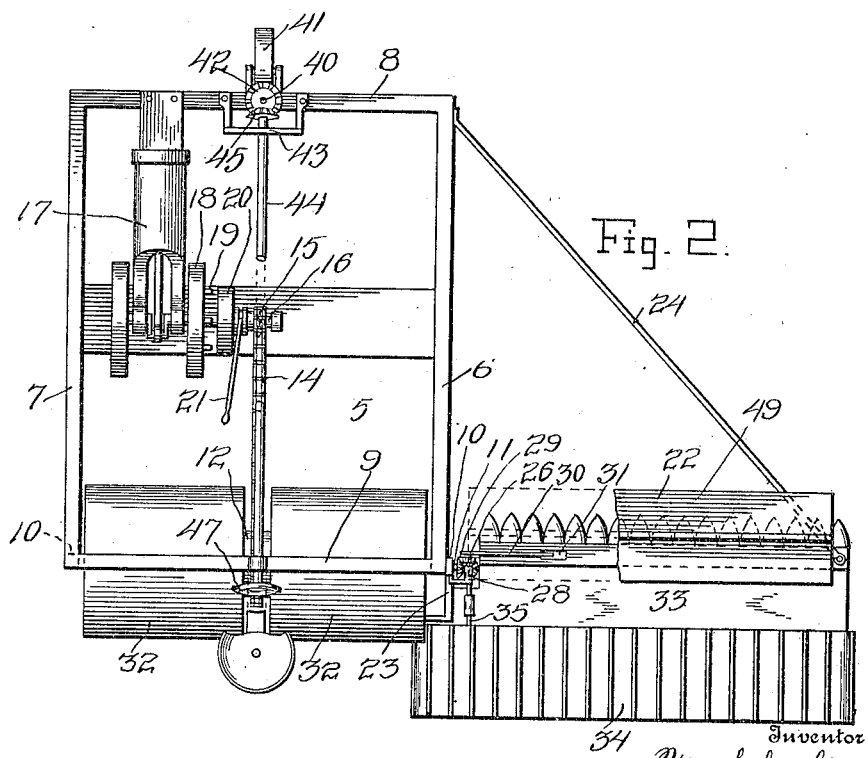

No. 837,739. PATENTED DEC. 4, 1906.
W. SCHULTZ.
MOWER.
APPLICATION FILED SEPT. 12, 1905.
2 SHEETS—SHEET 2.
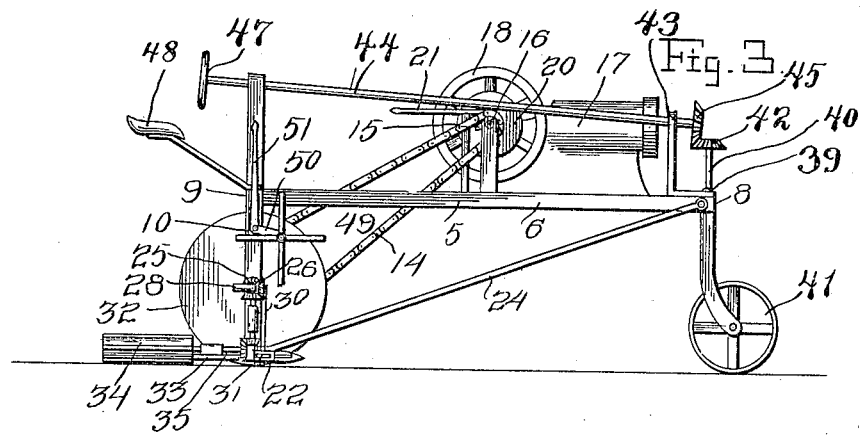
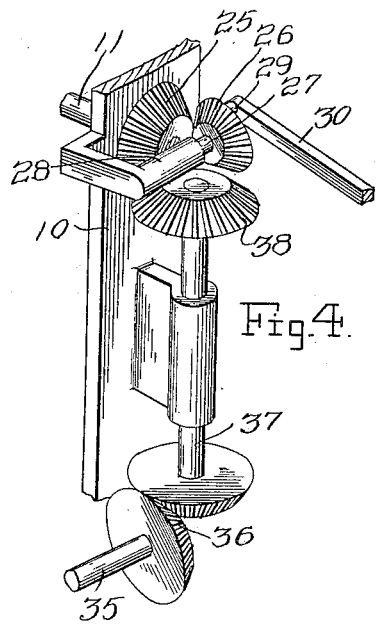
Witnesses
C. K. Reichenbach.
F. C. Jones
Inventor
Wm. Schultz.
By
Chandlee & Chandlee
Attorneys

UNITED STATES PATENT OFFICE.

WILLIAM SCHULTZ, OF PORTAGE, WISCONSIN.

MOWER.

No. 837,739. Specification of Letters Patent. Patented Dec. 4, 1906.

Application filed September 12, 1905. Serial No. 278,107.

*To all whom it may concern:*

Be it known that I, WILLIAM SCHULTZ, a citizen of the United States, residing at Portage, in the county of Columbia, State of Wisconsin, have invented certain new and useful Improvements in Mowers; and I do hereby declare the following to be a full, clear, and exact description of the invention, such as will enable others skilled in the art to which it appertains to make and use the same.

This invention relates to mowers, and has for its object to provide a mower especially adapted for cutting grass in soft or swampy land and which will include a novel arrangement of parts calculated to produce an efficient structure.

Other objects and advantages will be apparent from the following description.

In the drawings forming a portion of this specification, and in which like numerals of reference indicate similar parts in the several views, Figure 1 is a rear elevation of the present invention. Fig. 2 is a top plan view. Fig. 3 is a side elevation. Fig. 4 is a detail view of the gear connection between the cutter-bar and the axle.

Referring now to the drawings, the present invention comprises a horizontally-disposed rectangular frame 5, including side sills 6 and 7 and lateral front and rear end pieces 8 and 9, respectively.

Depending from the frame, at the rearward corners thereof, are hangers 10, in which there is journaled a transverse live axle 11, having a differential gear 12 therein at its center, this gear including an exterior sprocket-band 13, which receives a chain 14, the latter being also carried by a sprocket 15, mounted upon a shaft 16, revolubly supported in the frame. A gas-engine 17 is longitudinally mounted in the frame and has a fly-wheel 18, carrying clutch-fingers 19, arranged to receive a clutch-disk 20, splined upon the shaft 16 and movable through the medium of the lever 21 into and out of engagement with the clutch-fingers 19 of the fly-wheel. The gearing of the chain is such that the power is multiplied, the axle 11 being thus turned at a much lower rate than the sprocket 15, so that the clutch may be thrown in without danger of stopping the engine.

Extending laterally at one side of the frame, at the rearward portion thereof, there is a cutter-bar 22, which is connected with the adjacent hanger 10 by means of a rod 23, the outer end of the cutter-bar being connected with the forward end of the frame by a draft-rod 24. Mounted upon the axle 11 at the end adjacent to the cutter-bar and outwardly of the hanger 10 there is a bevel-gear 25, which meshes with a similar transversely-extending gear 26, carried by a stub-shaft 27, the latter being journaled in a bearing 28, carried by the adjacent hanger 10. Upon its forward surface the gear 26 has a wrist-pin 29, upon which is pivoted a pitman 30, the latter being connected with the tooth-bar 31 of the cutter-bar for reciprocation thereof when the gear 26 is revolved.

Mounted upon the axle 11 at opposite sides of the differential gear 12 there are traction-rollers 32, which are rotated with the axle to drive the machine over the ground.

A rearwardly-extending platform 33 is carried by the cutter-bar, and mounted upon this platform there is an endless carrier 34, which receives cut grass from the cutter-bar and deposits it in the rear of the traction-rollers, this carrier being driven by a horizontal shaft 35, which is connected, by means of bevel-gears 36, with a vertical shaft 37, journaled upon the hanger 10, which lies adjacent to the cutter-bar and connected by means of a gear 38 with the gear 25 for rotation thereby.

Revolubly mounted in a bracket 39, carried by the forward end piece 8, there is a shaft 40 of a pilot-wheel 41, this shaft having a bevel-gear 42. An upwardly-extending yoke 43 is carried by the front end piece 8 and has journaled therein the forward portion of a steering-shaft 44, provided with a gear 45 at its forward end, meshing with the gear 42 for movement of the pilot-wheel, as will be readily understood, when the steering-shaft is revolved. The rearward end of the steering-shaft carries a wheel 47, which lies in position to be reached by the occupant of a seat 48, mounted at the rearward end of the frame.

A revoluble wheel 49 is disposed to throw out grass upon the carrier 34, and this reel is arranged for vertical movement, it being carried by an arm 50, pivoted to the side sills 6 of the frame, and a hand-lever 51 is pivoted to the frame and connected with the arm 50 to raise and lower the reel to suit different conditions.

It is thought that the operation of the machine will be clearly understood without detailed description. The grass is cut by the cutter-bar, which is driven indirectly by the gasolene-engine, and the reel 49 throws the grass upon the carrier, by which it is carried laterally and deposited in the rear of the traction-rollers.

What is claimed is—

In a mower, the combination with a frame having depending hangers, an axle journaled in the hangers and extending outwardly beyond the hangers at one end, a bevel-gear carried by said end of the axle, a shaft journaled upon one of the hangers and having a gear meshing with the bevel-gear of the axle, a cutter-bar pivoted to the lower end of the said hanger, a conveyer mounted rearwardly of the cutter-bar, a driving-shaft for the conveyer, bevel-gear connections between the first-named shaft and the driving-shaft, a bearing carried by the said hanger, a stub-shaft journaled in the bearing and having a gear meshing with the gear of the axle, a pitman pivoted eccentrically upon the gear of the stub-shaft and connected with the cutter-bar for operation thereof, spaced traction-rollers mounted upon the axle, a power plant mounted upon the frame, operative connections between the axle and the power plant, a yoke at the forward end of the frame, a steering-shaft journaled in the yoke, a pilot-wheel pivotally mounted at the forward end of the frame, and bevel-gear connections between the pilot-wheel and the steering-shaft.

In testimony whereof I affix my signature in presence of two witnesses.

WILLIAM SCHULTZ.

Witnesses:
H. E. ANDREWS,
A. P. CHRISTENSON.